(12) United States Patent
Hopkins et al.

(10) Patent No.: US 12,469,037 B1
(45) Date of Patent: Nov. 11, 2025

(54) COMPUTING DEVICE, METHOD AND COMPUTER PROGRAM PRODUCT FOR CONSTRUCTING A CONSOLIDATED MESSAGE

(71) Applicant: McKesson Corporation, Irving, TX (US)

(72) Inventors: Stacy Hopkins, Loganville, GA (US); James Donald Stillman, Worthington, OH (US)

(73) Assignee: McKesson Corporation, Irving, TX (US)

( * ) Notice: Subject to any disclaimer, the term of this patent is extended or adjusted under 35 U.S.C. 154(b) by 278 days.

(21) Appl. No.: 17/205,457

(22) Filed: Mar. 18, 2021

(51) Int. Cl.
*G16H 40/20* (2018.01)
*G06Q 10/08* (2023.01)
(Continued)

(52) U.S. Cl.
CPC ........... *G06Q 30/016* (2013.01); *G06Q 10/08* (2013.01); *G16H 20/10* (2018.01); *G16H 40/20* (2018.01); *G16H 70/40* (2018.01)

(58) Field of Classification Search
CPC ...... G06Q 30/016; G06Q 50/28; G16H 40/20; G16H 70/40; G16H 20/10
(Continued)

(56) References Cited

U.S. PATENT DOCUMENTS 6,973,435 B1 12/2005 Sioufi et al.
7,769,601 B1 8/2010 Bleser et al.
(Continued)

FOREIGN PATENT DOCUMENTS

CA 2495018 C 6/2013
CA 2552056 C 6/2015
(Continued)

OTHER PUBLICATIONS

*PPD Collaborates with CISYS LifeSciences to Implement New Web-based Event Adjudication System*, Sep. 2, 2015, [article, online], retrieved on Dec. 3, 2021, from the Internet <URL: https://www.businesswire.com/news/home/20150902005869/en/PPD-Collaborates-with-CISYS-LifeSciences-to-Implement-New-Web-based-Event-Adjudication-System>, 4 pages.

(Continued)

*Primary Examiner* — Devin C Hein
*Assistant Examiner* — Dawn Trinah Haynes
(74) *Attorney, Agent, or Firm* — Alston & Bird LLP

(57) ABSTRACT

A computing device, method and computer program product are provided to construct a consolidated message. In the context of a computing device, the computing device includes a communication interface configured to receive first information regarding a product from a request processor in response to an inquiry from a source. The computing device also includes processing circuitry configured to determine whether the product is supported by one or more operational services. In an instance in which the product is supported by one or more operational services, the processing circuitry is configured to obtain second information regarding the one or more operational services to construct the consolidated message having a predefined message format and containing both the first information and the second information. The communication interface is also configured to cause the consolidated message containing both the first information and the second information to be provided to the source of the inquiry.

13 Claims, 4 Drawing Sheets

(51) Int. Cl.
  *G06Q 30/016* (2023.01)
  *G16H 20/10* (2018.01)
  *G16H 70/40* (2018.01)

(58) Field of Classification Search
  USPC .............................................................. 705/2
  See application file for complete search history.

(56) References Cited

U.S. PATENT DOCUMENTS

| | | | |
|---|---|---|---|
| 8,219,422 | B2 | 7/2012 | Hallberg |
| 8,660,859 | B1 | 2/2014 | Ansari et al. |
| 8,781,851 | B2 | 7/2014 | Anderson et al. |
| 10,438,693 | B1 | 10/2019 | Vandervoort et al. |
| 11,610,655 | B1 | 3/2023 | Rubin |
| 11,676,692 | B1 | 6/2023 | Arends |
| 2002/0143582 | A1 | 10/2002 | Neuman et al. |
| 2003/0130868 | A1 | 7/2003 | Coelho |
| 2004/0006490 | A1 | 1/2004 | Gingrich et al. |
| 2004/0122712 | A1 | 6/2004 | Hill, Sr. et al. |
| 2004/0172301 | A1 | 9/2004 | Mihai et al. |
| 2005/0049746 | A1 | 3/2005 | Rosenblum |
| 2005/0102192 | A1 | 5/2005 | Gerrits et al. |
| 2006/0212318 | A1 | 9/2006 | Dooley |
| 2006/0224414 | A1* | 10/2006 | Astrup .................. G16H 20/10 |
| 2006/0271402 | A1 | 11/2006 | Rowe, III et al. |
| 2008/0275723 | A1 | 11/2008 | Wiley et al. |
| 2009/0198520 | A1 | 8/2009 | Piovanetti-Perez |
| 2012/0016687 | A1 | 1/2012 | Dhavle et al. |
| 2012/0053955 | A1 | 3/2012 | Martin |
| 2013/0096938 | A1 | 4/2013 | Stueckemann |
| 2013/0179177 | A1 | 7/2013 | Dhavle et al. |
| 2016/0055314 | A1 | 2/2016 | Anderson et al. |
| 2016/0117472 | A1 | 4/2016 | Padmani et al. |
| 2016/0188820 | A1 | 6/2016 | Brown et al. |
| 2017/0098043 | A1* | 4/2017 | Antony .................. G16H 40/20 |
| 2017/0329921 | A1 | 11/2017 | Willard et al. |
| 2018/0075215 | A1* | 3/2018 | Loiacono ............ G06F 19/3462 |
| 2018/0075220 | A1 | 3/2018 | Hill, Sr. |
| 2018/0293351 | A1 | 10/2018 | Simons et al. |
| 2018/0293358 | A1 | 10/2018 | Sooudi et al. |
| 2019/0333158 | A1 | 10/2019 | Cedergreen |
| 2019/0385734 | A1 | 12/2019 | Pinsonneault |
| 2020/0244605 | A1* | 7/2020 | Nagaraja ................. G16H 10/20 |
| 2021/0295970 | A1 | 9/2021 | Lau et al. |
| 2022/0398667 | A1 | 12/2022 | Cichy |
| 2023/0059605 | A1* | 2/2023 | Sait ....................... G06Q 30/016 |
| 2023/0268044 | A1 | 8/2023 | Bothra |

FOREIGN PATENT DOCUMENTS

| | | |
|---|---|---|
| CA | 2900718 A1 | 2/2016 |
| CA | 2552057 C | 8/2016 |
| WO | WO 2012/009513 A1 | 1/2012 |

OTHER PUBLICATIONS

U.S. Appl. No. 16/832,318, "Method, Apparatus, And Computer Program Product For Providing Estimated Prescription Costs", unpublished (filed Mar. 27, 2020), (Stacy Hopkins, Inventor) (McKesson Corporation, Assignee).

U.S. Appl. No. 16/878,778, "Method, Apparatus, And Computer Program Product For Constructing An Updated Order Including Information From Different Sources", unpublished (filed May 20, 2020), (Stacy Hopkins, Inventor) (McKesson Corporation, Assignee).

U.S. Appl. No. 17/201,020, "Method, Apparatus, And Computer Program Product For Constructing An Updated Order Verifying Compliance With Predefined Rule(s)", Unpublished (filing date Mar. 15, 2021), (Stacy Hopkins, Inventor), (McKesson Corporation, Assignee).

U.S. Appl. No. 17/205,457, "Computing Device, Method And Computer Program Product For Constructing A Consolidated Message", Unpublished (filing date Mar. 18, 2021), (Stacy Hopkins, Inventor), (McKesson Corporation, Assignee).

United States Patent and Trademark Office, Non-Final Office Action received for U.S. Appl. No. 16/878,778, dated Dec. 17, 2021, 29 pages, U.S.

Transaction Data Systems. "Computer-Rx Empowers Community Pharmacies with Digital Communications Solutions from Updox" PRNewsWire.com (Aug. 7, 2018).

U.S. Appl. No. 17/678,654, "Method, Apparatus, And Computer Program Product For Providing Synchronized Messaging", Unpublished (filing date Feb. 23, 2022), (Stacy Hopkins, Inventor), (McKesson Corporation, Assignee).

United States Patent and Trademark Office, Final Office Action received for U.S. Appl. No. 16/878,778, dated May 3, 2022, 37 pages, U.S.

Bahga, Arshdeep, et al., "A Cloud-based Approach for Interoperable Electronic Health Records (EHRs)," in IEEE Journal of Biomedical and Health Informatics, Sep. 2013, pp. 894-906, vol. 17, No. 5, downloaded by the USPTO from IEEE Xplore on Nov. 29, 2022.

United States Patent and Trademark Office, Advisory Action received for U.S. Appl. No. 16/878,778, dated Sep. 23, 2022, 4 pages, U.S.

United States Patent and Trademark Office, Non-Final Office Action received for U.S. Appl. No. 16/878,778, dated Dec. 6, 2022, 24 pages, U.S.

Klann, Jeffrey G., et al., "Supporting Multi-sourced Medication Information in i2b2", AMIA Annual Symposium Proceeding, Nov. 5, 2015, pp. 747-755, PubMed ID: 26958210, PubMed Central ID: PMC4765563.

United States Patent and Trademark Office, Notice of Allowance received for U.S. Appl. No. 16/878,778, dated Apr. 21, 2023, 16 pages, U.A.

United States Patent and Trademark Office, Non-Final Office Action received for U.S. Appl. No. 17/201,020, dated Dec. 21, 2023, 25 pages, U.S.A.

Wang, Guijun, et al., "Intelligent Aggregation of Purchase Orders in e-Procurement", Proceedings of the 2005 Ninth IEEE International EDOC Enterprise Computing Conference, Sep. 19-23, 2005, Enschede, Netherlands, 10 pages.

United States Patent and Trademark Office, Notice of Allowance and Interview Summary received for U.S. Appl. No. 17/201,020, dated Jul. 11, 2024, 18 pages, U.S.A.

United States Patent & Trademark Office, Non-Final Office Action received for U.S. Appl. No. 17/678,654, dated Mar. 29, 2024, 31 pages, US.

United States Patent and Trademark Office, Final Office Action received for U.S. Appl. No. 17/678,654, dated Feb. 3, 2025, 26 pages, U.S.A.

United States Patent and Trademark Office, Non-Final Office Action received for U.S. Appl. No. 17/678,654, dated Jun. 11, 2025, 26 pages, U.S.A.

* cited by examiner

COMPUTING DEVICE, METHOD AND COMPUTER PROGRAM PRODUCT FOR CONSTRUCTING A CONSOLIDATED MESSAGE

TECHNOLOGICAL FIELD

An example embodiment relates generally to the construction of a consolidated message and, more particularly, to the construction of a consolidated message including both first information regarding a product provided by a request processor in response to an inquiry from a source and second information regarding one or more operational services associated with the product.

BACKGROUND

Operational services are associated with and serve to support some products to facilitate the adoption of the product including the purchase of the product and the proper use of the product and other services relating to, for example, customer education, data reporting and the like. While operational services are intended to facilitate the adoption and proper use of a product, the identification and use of the operational services by a customer of the product may be complex and time consuming.

In this regard, the interaction of a customer of the product with the operational services may be distinct from the customer's activities associated with their purchase of the product. As such, the customer must identify and utilize the operational services, while separately performing the activities associated with purchase of the product. Thus, the customer must generally spend additional time and effort to secure the operational services, thereby decreasing the efficiency with which a customer who has purchased the product is able to benefit from the operational services.

BRIEF SUMMARY

A computing device, method and computer program product are provided in accordance with an example embodiment in order to construct a consolidated message. The consolidated message includes both first information regarding a product that is provided by a request processor in response to an inquiry from a source, such as in conjunction with the purchase of the product, and second information regarding one or more operational services that support the product. As such, the source of the inquiry not only receives the requested information that was a subject to the inquiry, but also information regarding one or more operational services that support the product that was the subject of the inquiry. As such, during the course of purchasing a product, the customer may be provided with information regarding one or more operational services that support the product in an efficient manner without requiring that the source of the inquiry or the customer of the product expend additional time and resources to identify and secure the one or more operational services that support the product.

As a result, the computing device, method and computer program product of an example embodiment provide technical advantages by conserving the processing resources and network resources, such as bandwidth, expended to obtain both first information regarding a product that is provided by a request processor in response to the inquiry from a source, such as in conjunction with the purchase of the product, and second information regarding one or more operational services that support the product in a consolidated message. In this regard, the processing resources and network resources, such as bandwidth, expended to construct the consolidated message are conserved relative to the processing resources and network resources otherwise expended to separately provide the first and second information, such as to support the separate streams of messages between the source or a customer of the product and: (i) the request processor to obtain the first information in conjunction with the purchase of the product and (ii) a provider of the operational services in order to identify the relevant operational services and to then obtain the second information regarding the one or more operational services that support the product.

In an example embodiment, a computing device is provided that is configured to construct a consolidated message. The computing device includes a communication interface configured to receive first information regarding a product from a request processor in response to an inquiry from a source. The computing device also includes processing circuitry configured to determine whether the product is supported by one or more operational services. In an instance in which the product is supported by one or more operational services, the processing circuitry is configured to obtain second information regarding the one or more operational services to construct the consolidated message having a predefined message format and containing both the first information and the second information. The communication interface is also configured to cause the consolidated message containing both the first information and the second information to be provided to the source of the inquiry.

The processing circuitry of an example embodiment is configured to determine whether the product is supported by one or more operational services by accessing a table defining products supported by one or more operational services. In an example embodiment, the processing circuitry is configured to obtain second information by obtaining messaging associated with the product that is to be provided to the source of the inquiry. The messaging may identify a point of contact to provide assistance with respect to the product. In instance in which the inquiry is provided with respect to a customer having a preferred supplier, the messaging may additionally or alternatively identify a supplier of the product, different than the preferred supplier.

In an embodiment in which the product is a prescription medication, the inquiry may be a prescription benefit coverage inquiry, and the operational services may include hub services. In this example embodiment, the processing circuitry may be configured to obtain second information by obtaining messaging associated with the prescription medication. In an instance in which the prescription benefit coverage inquiry is provided with respect to a patient having a preferred pharmacy, and the messaging may identify a pharmacy, different than the preferred pharmacy, configured to provide the hub services for the prescription medication. The pharmacy identified by the messaging may also be configured to transfer a prescription for the prescription medication to the preferred pharmacy for dispensing. In an embodiment in which the first information comprises benefit information, the processing circuitry of an example embodiment may be further configured to determine from the benefit information whether a benefit is government funded. The processing circuitry of this example embodiment may also be configured in a manner dependent upon the benefit not being government funded to determine whether the prescription medication is supported by one or more hub services that identify a discount available for the prescription medication.

In another embodiment, a method is provided for constructing a consolidated message. The method includes receiving first information regarding a product from a request processor in response to an inquiry from a source and determining whether the product is supported by one or more operational services. In an instance in which the product is supported by one or more operational services, the method also includes obtaining second information regarding the one or more operational services and constructing the consolidated message having a predefined message format and containing both the first information and the second information. The method further includes causing the consolidated message containing both the first information and the second information to be provided to the source of the inquiry.

The method of an example embodiment determines whether the product is supported by one or more operational services by accessing a table defining products supported by one or more operational services. In an example embodiment, the method obtains the second information by obtaining messaging associated with the product that is to be provided to the source of the inquiry. The messaging may identify a point of contact to provide assistance with respect to the product. In an instance in which the inquiry is provided with respect to a customer having a preferred supplier, the messaging may identify a supplier of the product, different than the preferred supplier.

In an embodiment in which the product includes prescription medication, the inquiry includes a prescription benefit coverage inquiry and the operational services include hub services. The method of this example embodiment obtains second information by obtaining messaging associated with the prescription medication. In this example embodiment, the prescription benefit coverage inquiry may be provided with respect to a patient having a preferred pharmacy, and the messaging may identify a pharmacy, different than the preferred pharmacy, configured to provide the hub services for the prescription medication. The pharmacy that is identified may also be configured to transfer a prescription for the prescription medication to the preferred pharmacy for dispensing. In an embodiment in which the first information comprises benefit information, the may also include determining from the benefit information whether a benefit is government funded, and determining in a manner dependent upon the benefit not being government funded to whether the prescription medication is supported by one or more hub services that identify a discount available for the prescription medication.

In a further example embodiment, a computer program product is provided that is configured to construct a consolidated message. The computer program product includes at least one non-transitory computer-readable storage medium having computer-executable program code instructions stored therein with the computer-executable program code instructions including program code instructions configured to receive first information regarding a product from a request processor in response to an inquiry from a source. The computer-executable program code instructions also include program code instructions configured to determine whether the product is supported by one or more operational services and, in an instance in which the product is supported by one or more operational services, to obtain second information regarding the one or more operational services. The computer-executable program code instructions further include program code instructions configured to construct the consolidated message having a predefined message format and containing both the first information and the second information and to cause the consolidated message containing both the first information and the second information to be provided to the source of the inquiry.

The program code instructions of an example embodiment that are configured to determine whether the product is supported by one or more operational services include program code instructions configured to access a table defining products supported by one or more operational services. In an example embodiment, the program code instructions configured to obtain second information include program code instructions configured to obtain messaging associated with the product that is to be provided to the source of the inquiry. The messaging may identify a point of contact to provide assistance with respect to the product. In an instance in which the inquiry is provided with respect to a customer having a preferred supplier, the messaging may identify a supplier of the product, different than the preferred supplier.

In an embodiment in which the product includes a prescription medication, the inquiry includes a prescription benefit coverage inquiry, and the operational services include hub services. In this example embodiment, the program code instructions configured to obtain second information include program code instructions configured to obtain messaging associated with the prescription medication. In this example embodiment, the prescription benefit coverage inquiry may be provided with respect to a patient having a preferred pharmacy, and the messaging may identify a pharmacy, different than the preferred pharmacy, configured to provide the hub services for the prescription medication. The pharmacy that is identified may also be configured to transfer a prescription for the prescription medication to the preferred pharmacy for dispensing. In an embodiment in which the first information comprises benefit information, wherein the computer-executable program code instructions may also include program code instructions configured to determine from the benefit information whether a benefit is government funded, and to determine, in a manner dependent upon the benefit not being government funded, whether the prescription medication is supported by one or more hub services that identify a discount available for the prescription medication.

BRIEF DESCRIPTION OF THE DRAWINGS

Figure 1:
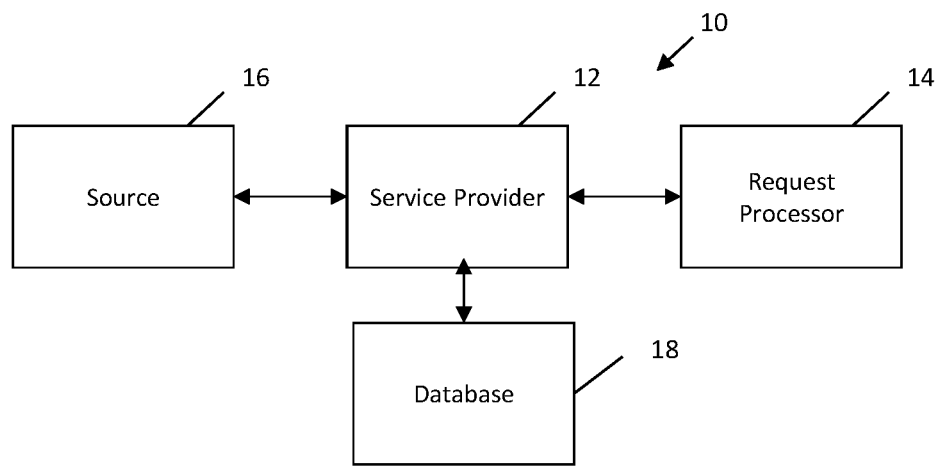
Figure 2:
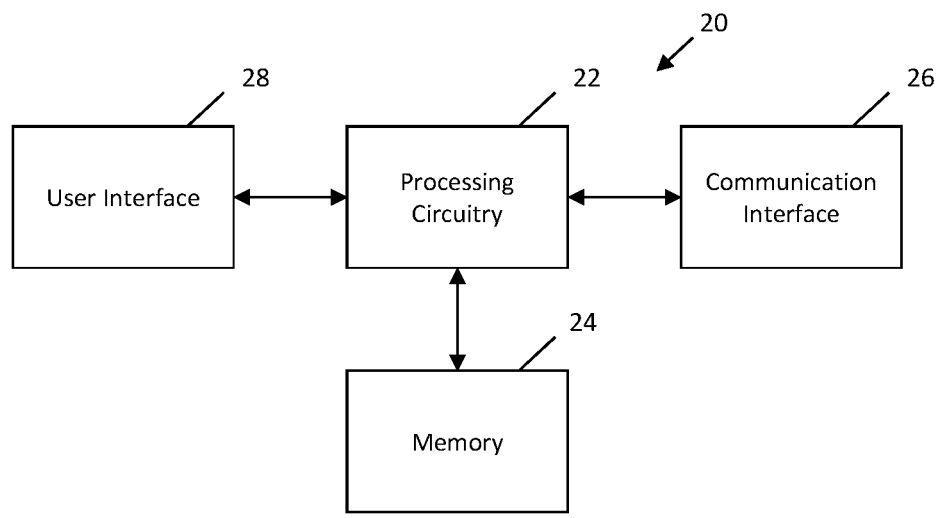
Figure 3:
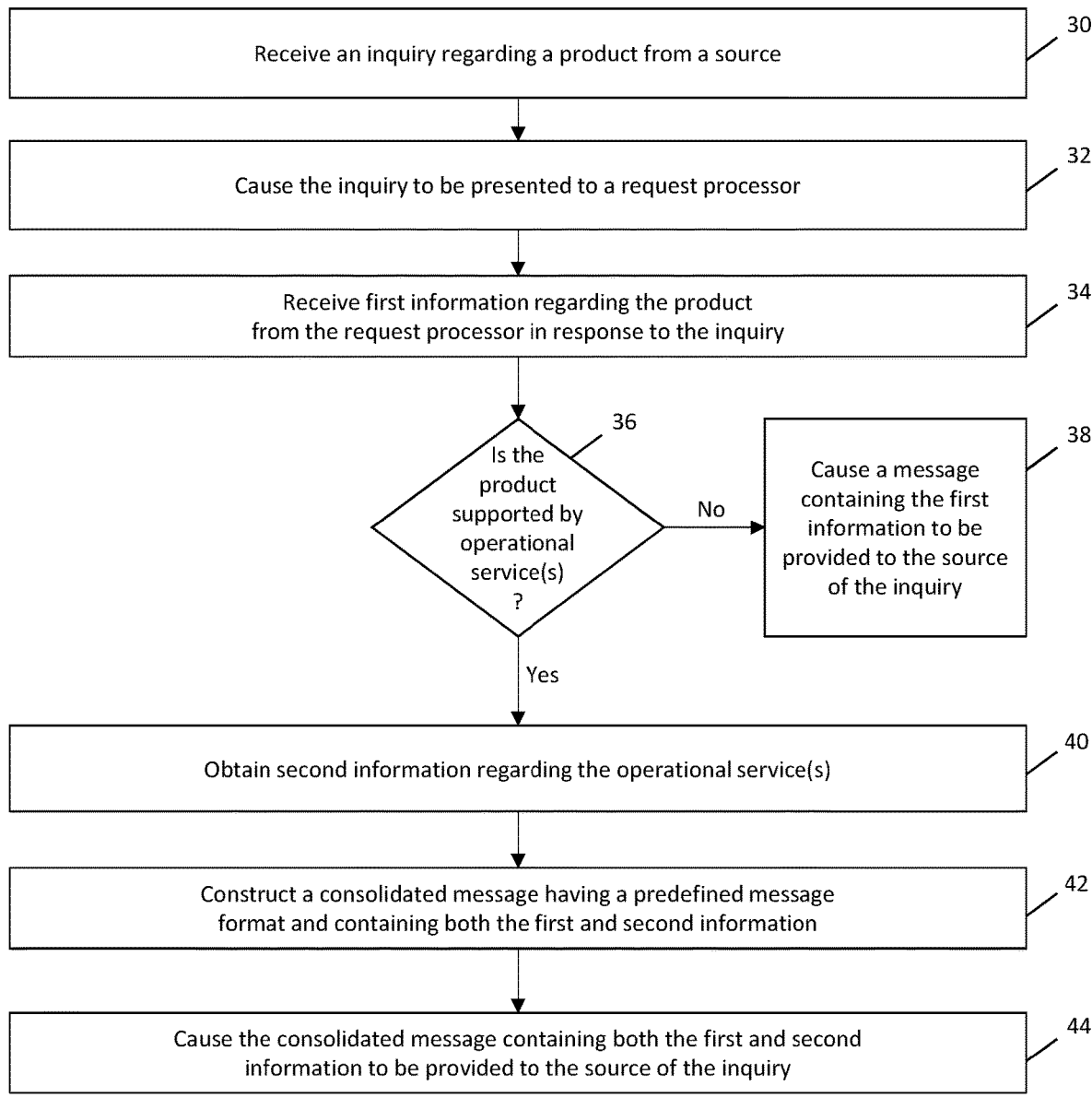
Figure 4:
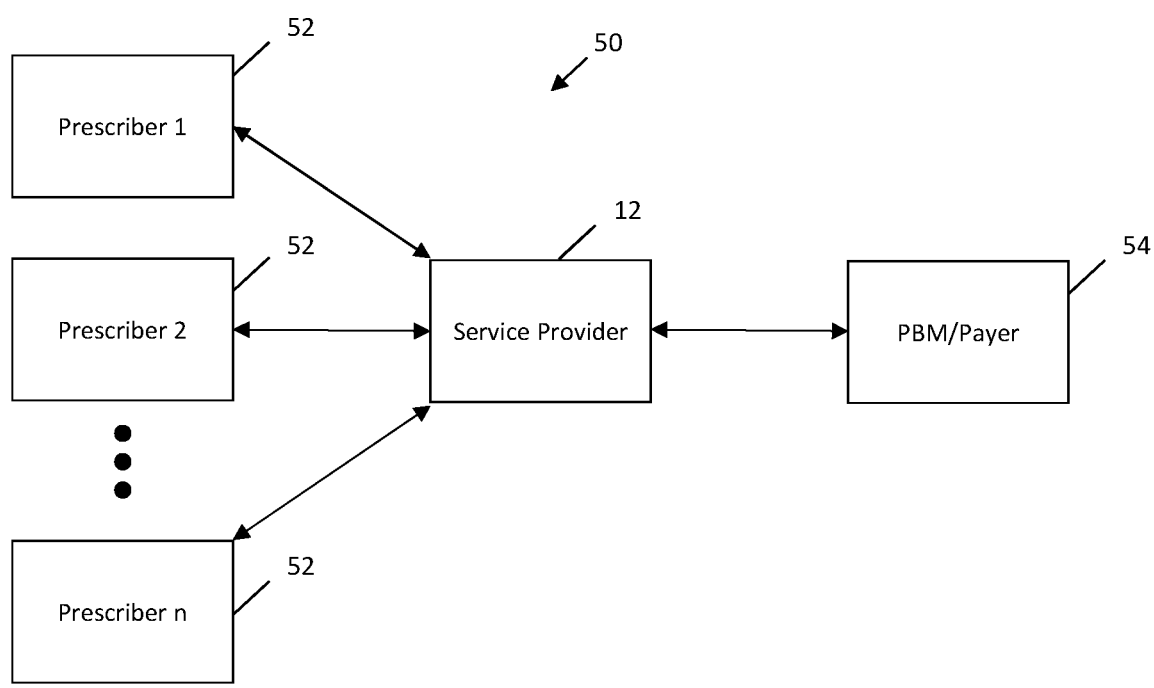
Figure 5:
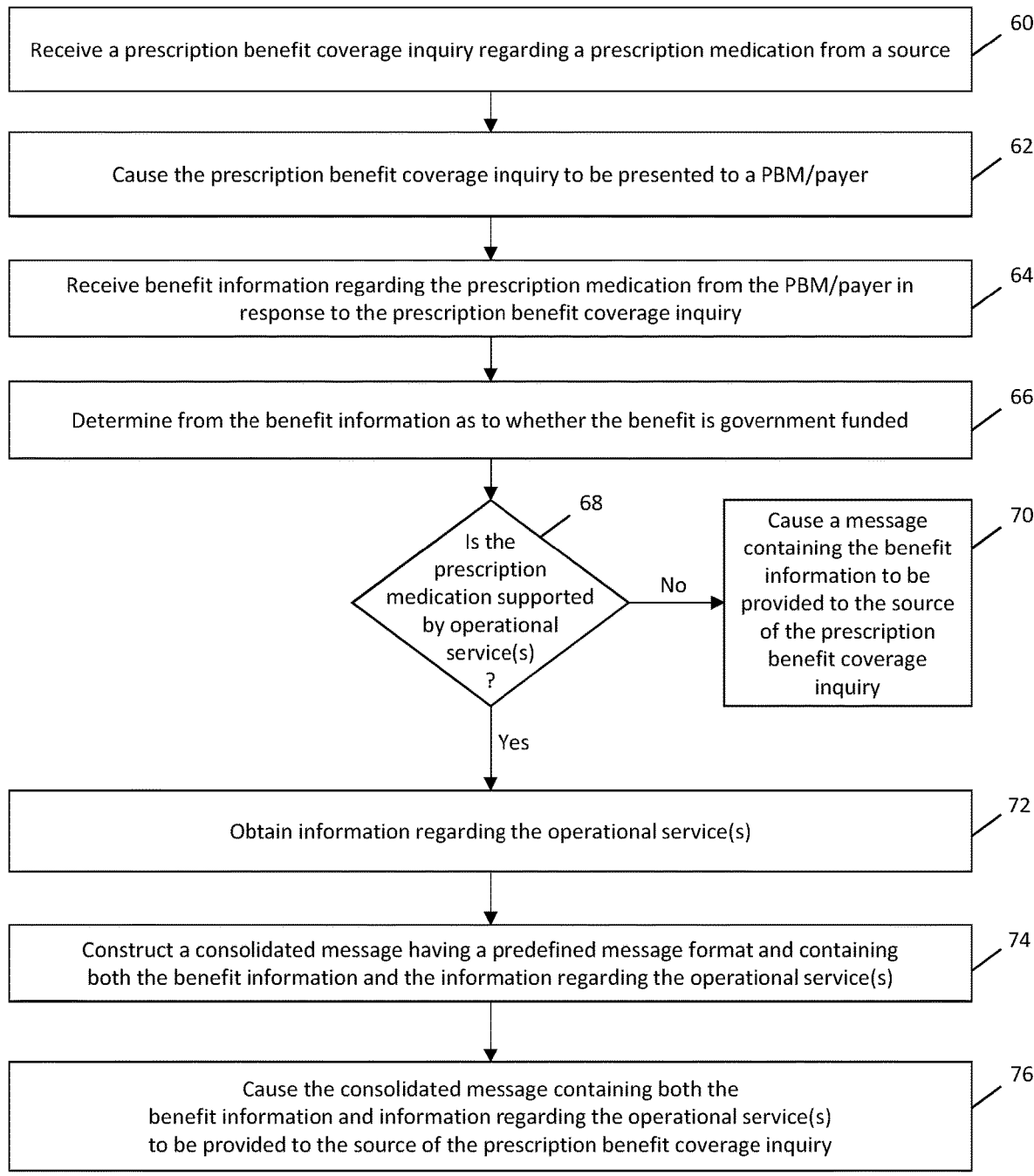

Having thus described certain embodiments of the invention in general terms, reference will now be made to the accompanying drawings, which are not necessarily drawn to scale, and wherein:

FIG. 1 is a block diagram of a system including an apparatus that may be specifically configured in accordance with an example embodiment in order to facilitate communication between multiple parties;

FIG. 2 is a block diagram of an apparatus that may be specifically configured in accordance with an example embodiment in order to facilitate communication between multiple parties;

FIG. 3 is a flowchart of the operations performed, such as by the apparatus of FIG. 2, in accordance with an example embodiment;

FIG. 4 is a block diagram of a system including an apparatus in accordance with an example embodiment in order to facilitate communications between one or more prescribers and one or more pharmacy benefit management entities or payers in order to efficiently construct a consolidated message including benefit information and information regarding one or more operational services configured to support a prescription medication; and FIG. 5 is a flowchart illustrating the operations performed, such as by the apparatus of FIG. 2, in accordance with another example embodiment

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A computing device, method and computer program product are provided for constructing a consolidated message. The consolidated message includes both first information regarding a product as provided by a request processor in response to an inquiry from a source, such as in conjunction with the purchase of the product, as well as second information regarding one or more operational services that support the product, such as by supporting the adoption and use of the product. The consolidated message may be constructed in conjunction with a variety of different applications and in conjunction with a variety of different products, one of which is described hereinbelow in conjunction with prescription medication as illustrated in FIGS. 4 and 5.

The operational services that support a product may vary depending upon the product. Examples of operational services are services that support the purchase of and payment for a product including services associated with securing authorization, if required, for the purchase of the product, securing at least partial reimbursement for the price of the product, utilizing rebates or other incentive programs associated with the purchase of the product or the like. Other operational services include services that support compliance with any rules or instructions governing the use of the product. Additional examples of operational services include services associated with education of the consumer of the product. However, these operational services are provided by way of example and different types of operational services may be provided depending upon, for example, the product.

One example of a system 10 in which the computing device, method and computer program product of an example embodiment may be deployed is depicted in FIG. 1. As shown, the system includes a service provider 12 that includes or is embodied by the computing device and is configured to communicate with a plurality of different parties, such as a request processor 14, a source 16, a database 18 and optionally a supplier. The computing device of the service provider of an example embodiment may, in turn, be embodied in a variety of different manners including, for example, by a server, a plurality of networked computing devices, a computer workstation or the like. Regardless of the manner in which the computing device is embodied, the computing device 20 of the service provider of an example embodiment includes, is associated with or is otherwise in communication with processing circuitry 22, memory 24, communication interface 26 and optionally a user interface 28 as shown, for example, by FIG. 2.

In some embodiments, the processing circuitry 22 (and/or co-processors or any other processors assisting or otherwise associated with the processing circuitry) can be in communication with the memory 24 via a bus for passing information among components of the computing device 20. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally, or alternatively, the memory can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. Alternatively, the processing circuitry can include one or more processors configured in tandem via the bus to enable independent execution of instructions.

In an example embodiment, the processing circuitry 22 can be configured to execute instructions stored in the memory 24 or otherwise accessible to the processing circuitry. Alternatively, or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, the service provider 12) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment can also include the communication interface 26 that can be any means such as a device or circuitry embodied in either hardware or a combination of hardware and software that is configured to receive and/or transmit data from/to other electronic devices in communication with the apparatus, such as a database that stores data generated and/or employed by the processing circuitry 22. Additionally, or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally, or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

The computing device 20 may also optionally include a user interface 28 that may, in turn, be in communication with the processing circuitry 22 to provide output to a user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 24, and/or the like).

Referring now to FIG. 3, the operations performed, such as by the computing device 20 of the service provider 12 are depicted. As shown in block 30, the computing device, such as the communication interface 24, the processing circuitry 22 or the like, is configured to receive an inquiry regarding a product from a source 16. As noted above, any of a wide variety of products may be the subject of such an inquiry and, as a result, various types of inquiries may be received from the source depending upon the type of product. In one example embodiment, however, the inquiry received from the source solicits information regarding the cost of the product or at least the portion of the cost of a product that must be borne by the customer purchasing the product.

As shown in block 32, the computing device 20, such as the communication interface 24, the processing circuitry 22 or the like, is configured to cause the inquiry to be presented to the request processor 14 which, in turn, provides first information regarding the product and responsive to the inquiry from the source 16. As such, the computing device, such as the communication interface, the processing circuitry or the like, is configured to receive the first information regarding the product from the request processor in response to the inquiry from the source. See block 34. The type of first information that is provided will vary depending upon the product and the type of inquiry. For example, in an instance in which the inquiry is to the portion of the cost of a product to be borne by a customer of the product, the first information may identify the portion of the cost of the product to be borne by the customer following application of any applicable discounts.

As shown in block 36, the computing device 20, such as the processing circuitry 22, is configured to determine whether the product is supported by one or more operational services. The computing device, such as the processing circuitry, may be configured to determine whether the product is supported by one or more operational services in various manners. In one example embodiment, a table, such as any type of listing or record regardless of whether the information is maintained in a tabular form, is maintained that defines the products supported by one or more operational services. The table may be stored, for example, by the memory device 24 or by an optional database 18 with which the computing device is in communication, such as shown in FIG. 1.

In an instance in which different operational services support different ones of the products, the table may identify, for each of the products identified by the table, the particular operational service(s) that support the respective product. In this example embodiment, the computing device 20, such as the processing circuitry 22, communication interface 26 or the like, is configured to determine whether the product is supported by one or more operational services by accessing the table identifying the one or more operational services that support the product. If the product is included within the table, the product is supported by one or more operational services. However, if the product is not listed by the table, the product will not be supported by one or more operational services.

The computing device 20, such as the processing circuitry 22, communication interface 26 or the like, may be configured to access the table of this example embodiment in various manners. In one embodiment, however, the computing device, such as the processing circuitry, the communication interface or the like, include an application programming interface (API) that is utilized to access the table defining the products supported by one or more operational services.

In an instance in which the product is not supported by one or more operational services, the computing device 20, such as the processing circuitry 22, the communication interface 26 or the like, is configured to cause a message containing the first information regarding a product provided by the request processor 14 to be provided to the source 16 of the inquiry. See block 38 of FIG. 3. Alternatively, in an instance in which the product is supported by one or more operational services, the computing device, such as the processing circuitry, the communication interface or the like, is configured to obtain second information regarding the one or more operational services. See block 40. The second information regarding the one or more operational services may identify the operational services that are available to support the product that is the subject of the inquiry. In an example embodiment, the second information that is obtained includes messaging associated with the product that is to be provided to the source of the inquiry. The messaging that is associated with the product may depend upon the application as well as the type of product that is the subject to the inquiry. In some embodiments, however, the messaging identifies a point of contact to provide assistance with respect to the product. As such, the source 16 of the inquiry and/or the customer purchasing the product may reference the point of contact in order to facilitate the purchase of, payment for, use of and/or education regarding the product. Additional or different types of messaging associated with the product may be provided in other embodiments. For example, in some instances in which the inquiry is provided with respect to a prospective customer who has a preferred supplier for products of the same general type as the product that is the subject of the inquiry. In this example embodiment, the messaging that is obtained may identify a supplier of the product, different than the preferred supplier.

As shown in block 42 in FIG. 3, the computing device 20, such as the processing circuitry 22 or the like, is configured to construct a consolidated message having a predefined message format and containing both the first information and the second information. In this regard, the consolidated message includes the first information regarding the product provided by the request processor 14 in response of the inquiry from the source 16 as well as the second information regarding one or more operational services that support the product, such as messaging associated with the product. The computing device, such as the processing circuitry, the communication interface 26 or the like, is also configured to cause the consolidated message containing both the first information and the second information to be provided to the source of the inquiry. See block 42.

Based upon the consolidated message, the source 16 of the inquiry, if different than the customer of the product, can provide the same or similar information to the customer and can advise the customer both as to the information provided by the request processor 14 in response to the inquiry from the source as well as with respect to information regarding one or more operational services intended to support the product. As such, the customer of the product can purchase and utilize the product in a manner that is informed by the operational services, thereby leading to an improved purchasing experience and increased adherence and compliance with any rules or instructions governing the utilization of a product.

The computing device 20, method and computer program product of an example embodiment therefore provide technical advantages by conserving the processing resources and the network resources, such as bandwidth, expended to obtain both first information regarding a product that is provided by a request processor 14 in response to the inquiry from a source 16, such as in conjunction with the purchase of the product, and second information regarding one or more operational services that support the product in a consolidated message. In this regard, the processing resources and network resources, such as bandwidth, expended to construct the consolidated message are conserved relative to the processing resources and network resources otherwise expended to separately provide the first and second information, such as to support the separate streams of messages between the source or a customer of the product and: (i) the request processor to obtain the first information in conjunction with the purchase of the product and (ii) a provider of the operational services in order to identify the relevant operational services and to then obtain the second information regarding the one or more operational services that support the product.

As noted above, the computing device 20, method and computer program product of an example embodiment may be utilized in a wide variety of different applications. By way of example, but not of limitation, the computing device, method and computer program product of an example embodiment are described hereinafter in relation to FIGS. 4 and 5 in which the initial inquiry is a prescription benefit coverage inquiry that determines the financial responsibility of a request processor 14 for a particular prescription and the subsequent order is a prescription order that triggers a prescription benefit coverage request to be directed to the request processor for the prescription order. In this example embodiment, the data and other information discussed below may therefore be stored and/or shared or otherwise transmitted pursuant to the Health Insurance Portability and Accountability Act (HIPAA) of 1996.

As shown in FIG. 4, a system 50 includes a service provider 12 which, in turn, is embodied by or includes a computing device 20 as shown in FIG. 2 and described above. The system of FIG. 4 also includes one or more sources 14 in the form of one or more prescribers 52 designated as Prescriber 1, Prescriber 2, . . . . Prescriber n in FIG. 4. A prescriber is a healthcare professional, such as a physician or other healthcare practitioner or practice or a healthcare system, such as an electronic healthcare record system operated or otherwise utilized by a physician or other healthcare practitioner to write and submit prescriptions for patients. The system of this example embodiment also includes one or more request processors 14 in the form of a pharmacy benefit management (PBM) entity or other payer 16, such as an insurance company or the like. Although FIG. 4 depicts a single request processor in the form of a PBM/payer, the system of this example embodiment may, instead, include a plurality of PBMs/payers. Although not shown, the system of this example embodiment may also include one or more suppliers in the form of one or more pharmacies. These pharmacies may be brick and mortar pharmacies or may be digital pharmacies or other types of pharmacies. Although described below in the context of an embodiment in which a prescriber is the source, the system may include other sources including, for example, a pharmacy, such as a pharmacy management system, or the customer, e.g., patient, who is considering purchase of the prescription medication.

Referring now to FIG. 5, the operations performed, such as by the computing device 20, in accordance with an example embodiment are depicted. As shown in block 60 of FIG. 5, the computing device, such as the processing circuitry 22, the communication interface 26 or the like, is configured to receive a prescription benefit coverage inquiry regarding a prescription medication from a source 16. The inquiry may be received from various sources including, for example, a prescriber 52 of the prescription medicine and, one embodiment, from the electronic health record (EHR) for a respective patient of the prescriber. In another embodiment, the source of the inquiry may be a pharmacy, such as a pharmacy management system, or a patient contemplating purchase of a prescription medication. The prescription benefit coverage inquiry provides information regarding the prescription medication including information identifying the prescription medication, such as the national drug code (NDC) or the generic product identifier (GPI) associated with the prescription medication, information identifying the quantity and/or dosage of the prescription medication, information identifying the prescriber 52, etc. The computing device, such as the processing circuitry, the communication interface or the like, is configured to cause the prescription benefit coverage inquiry to be presented, such as to be transmitted, to a request processor 14, such as a PBM or other payer 54, e.g., an insurance company, a governmental entity, etc. See block 62.

In response to the prescription benefit coverage inquiry, the computing device 20, such as the processing circuitry 22, the communication interface 26 or the like, is configured to receive benefit information regarding the prescription medication from the PBM or payer 54. See block 64. The benefit information identifies at least the amount that the patient would be required to pay for the prescription medication and, in some embodiment, the portion of the cost of the prescription medication that is to be borne by an insurance or other healthcare plan. Although the benefit information is generally provided by the PBM or other payer, the computing device, such as the processing circuitry, of other embodiments does not determine the coverage amount based on information provided by the PBM or other payer, but, instead, estimates the coverage amount, such as based on historical information. In this example embodiment, the computing device, such as the processing circuitry, the memory or the like, is configured to determine an estimate of the amount that a PBM or other payer would pay on behalf of the patient for a particular medication or other item. For example, the apparatus, such as the memory or another database with which the apparatus is in communication, may store historical information regarding the amount that a respective PBM or other payer has paid in the past for the same or similar quantity of the same medication having the same National Drug Code (NDC). In some embodiments, the historical information that is considered is also limited to historical information for the same pharmacy or chain of pharmacies in the same state. Further, the historical information that is considered may be limited to a most recent time period, such as an immediately preceding 60 day period. Based upon the historical information, the apparatus, such as the processing circuitry, is configured to determine the estimated amount that will be paid by the PBM or other payer. Further details regarding the construction and use of an updated order is provided by U.S. patent application Ser. No. 16/832,318 filed Mar. 27, 2020, the contents of which are expressly incorporated herein in their entirety.

The benefit information may also provide an indication as to whether the benefits are to be provided by a governmental entity, such as Medicare or Medicaid programs, or by a private entity, such as an insurance company. In an example embodiment, the computing device 20, such as the processing circuitry 22 or the like, is therefore configured to determine from the benefit information whether the benefits are government funded. See block 66. The identification of whether the benefits are government funded may at least partially direct the subsequent identification of operational service(s) as described below so as to increase the efficiency with which operational service(s) are described.

As shown in block 68, the computing device 20, such as the processing circuitry 22 or the like, is configured to determine whether the prescription medication is supported by one or more operational services. Although various types of operational services may support prescription medication, one example of operational services includes hub services that support certain prescription medications, such as prescription medication for rare and serious conditions. In these situations, the prescription medication may be distributed via more limited distribution networks and may require prior authorization or enhanced level of prior authorization. Hub services may provide any of a variety of services for patients of prescription medication including the provision of a single point of contact for a patient and may provide a variety of services, including services associated with reimbursement or other prescription benefits associated with the prescription medication, assistance with satisfying the prior authorization requirements, drug delivery and administration support, financial and co-pay assistance, patient education, compliance with risk evaluation mitigation strategies (REMS), data reporting and the like.

As another example of the operational services, the prescription medication may be a prescription medication that is subject to a limited distribution network, such as prescription medication designed to treat a less common condition with the prescription medication therefore being in more limited supply and, in some instances, more expensive. In this instance, the messaging associated with the prescription medication may identify a pharmacy, different than the preferred pharmacy of the patient, that is configured to provide the hub services for the prescription medication. In some instances, the pharmacy identified by the messaging that is configured to provide hub services for the prescription medication may be a non-dispensing pharmacy associated with a hub providing the hub services with the prescription thereafter being transferred from the pharmacy identified by the messaging, such as the non-dispensing pharmacy, to the preferred pharmacy of the patient for dispensing of the prescription medication. As such, the patient may avail themselves of the hub services provided by the non-dispensing pharmacy, while subsequently filling the prescription at the preferred pharmacy of the patient. In another example embodiment, the messaging could identify that the preferred pharmacy is not able to dispense the prescription medication and potentially identify one or more alternative pharmacies that could dispense the prescription medication, such as a result of the participation by the alternative pharmacies in a distribution network for the prescription medication. Additionally or alternatively, the messaging may identify a pharmacy used for intaking prescriptions that will also result in the initiation of hub services.

In some embodiments, the hub services identify discounts (or additional discounts) that are applicable for the prescription medication. As such, in an instance in which the benefits are to be provided by a private entity, that is, not a governmental entity, the hub services may identify any applicable discounts, such as discounts provided by a pharmaceutical-sponsored financial assistance program for the prescription medication. However, in an instance in which the benefit information indicates that the benefits are to be provided by a governmental entity, the computing device 20, such as the processing circuitry 22 or the like, of an example embodiment is not configured to detect hub services that identify discounts provided by a pharmaceutical-sponsored financial assistance program since such discounts would be inapplicable in the context of benefits provided by a governmental entity. As such, the computing device, such as the processing circuitry, may operate more efficiently by conserving the processing resources otherwise required to identify hub services that identify discounts provided by a pharmaceutical-sponsored financial assistance program.

Discounts associated with the prescription medication may also be identified by reference to other programs or information accessible via the healthcare network with which the computing device is in communication. In an instance in which the benefits are to be provided by a private entity, that is, not a governmental entity, the computing device 20, such as the processing circuitry 22 or the like, may be configured to identify any applicable discounts, such as discounts available via the healthcare network that are provided by a pharmaceutical-sponsored financial assistance program for the prescription medication. However, in an instance in which the benefit information indicates that the benefits are to be provided by a governmental entity, the computing device, such as the processing circuitry or the like, of an example embodiment is not configured to identify discounts provided by a pharmaceutical-sponsored financial assistance program since such discounts would be inapplicable in the context of benefits provided by a governmental entity. As such, the computing device, such as the processing circuitry, may operate more efficiently by conserving the processing resources otherwise required to identify discounts provided by a pharmaceutical-sponsored financial assistance program.

In an instance in which the prescription medication is not supported by operational services, the computing device 20, such as the processing circuitry 22, the communication interface 26 or the like, is configured to cause a message containing the benefit information, including any applicable discounts, to be provided to the source 16 of the prescription benefit coverage inquiry. See block 70 of FIG. 5. However, in an instance in which the prescription medication is supported by one or more operational services, the computing device, such as a processing circuitry, the communication interface or the like, is configured to obtain information regarding the operational service(s) for supporting the prescription medication that is the subject of the inquiry, such as from the memory device 24, database 18, etc. that maintains a listing of the operational service(s) available for the prescription medications. See block 72.

As shown in block 74 in FIG. 5, the computing device 20, such as the processing circuitry 22 or the like, is configured to construct a consolidated message having a predefined message format. The consolidated message contains both the benefit information and the information regarding the operational service(s) for supporting the prescription medication. In this regard, the consolidated message includes the benefit information regarding the prescription medication, such as information defining the patient's co-pay, provided by the PBM/payer 54 in response of the prescription benefit coverage inquiry from the source 16 as well as the information regarding one or more operational services that support the prescription medication, such as messaging associated with the prescription medication and/or, in an instance in which the benefits are determined to be provided not by a governmental entity, but by a private entity, such as an insurance company, any applicable discounts for the prescription medication, such as discounts provided by a pharmaceutical-sponsored financial assistance program for the prescription medication. In some embodiments, the consolidated message may include additional types of information, such as an indication as to whether the prescription medication may be the subject of an updated order that allows for more efficient processing of the prescription order, such as in an instance in which both the prescriber 52 and the pharmacy to which a subsequent prescription order for the patient will be directed are able to utilize the updated order. Further details regarding the construction and use of an updated order is provided by U.S. patent application Ser. No. 16/878,778 filed May 20, 2020, the contents of which are expressly incorporated herein in their entirety. The computing device, such as the processing circuitry, the communication interface 26 or the like, is also configured to cause the consolidated message containing both the benefit information and the information regarding operational service(s) available to support the prescription medication to be provided to the source of the inquiry, such as to prescriber 52, the patient, the patient's electronic health record, a pharmacy, e.g., a pharmacy management system, or the like. See block 76.

Based upon the consolidated message, the source 16 of the inquiry, if different than the patient of the prescription medication, can provide the same or similar information to the patient and can advise the patient both as to the benefit information provided by the PBM/payer 54 in response to the inquiry from the source 16 as well as with respect to information regarding one or more operational services intended to support the prescription medication. As such, the patient can purchase the prescription medication in a manner that is informed by the operational services, thereby leading to an improved purchasing experience and increased adherence and compliance with any rules or instructions governing the utilization of the prescription medication.

Based upon at least the benefit information, the source 16 of the inquiry, such as the prescriber 52, sometimes in combination with the patient, determines whether the prescription for the prescription medication should be issued, such as in an instance in which the patient is able to afford the prescription medication. In an instance in which the prescription is written and then is filled, the information obtained regarding the operational services that support the prescription medication and that have been provided to the patient facilitate the purchase of the medication and the use of the medication by the patient. As such, the patient's adherence to the rules governing the use of the prescription medication may be enhanced, thereby similarly enhancing the treatment provided to the patient.

As noted above, the computing device 20, method and computer program product of this example embodiment therefore provide technical advantages by conserving the processing resources and the network resources, such as bandwidth, expended to obtain both benefit information regarding prescription medication that is provided by the PBM/payer 54 in response to the inquiry from a source 16, such as in conjunction with writing a prescription, and information regarding one or more operational services that support the prescription medication in a consolidated message. In this regard, the processing resources and network resources, such as bandwidth, expended to construct the consolidated message are conserved relative to the processing resources and network resources otherwise expended to separately provide the benefit information and the information regarding operational service(s) that are available to support the prescription medication, such as to support the separate streams of messages between the source or a customer of the product and: (i) the PBM/payer to obtain the benefit information in conjunction with the purchase of the prescription medication and (ii) a provider of the operational services in order to identify the relevant operational services and to then obtain the information regarding the one or more operational services that support the prescription medication.

As noted above, FIGS. 3 and 5 are flowcharts illustrating the operations performed by a computing device 20, method and computer program product, such as the computing device of FIG. 2, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 24 of a computing device employing an embodiment of the present invention and executed by a processing circuitry 22 of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 5, when executed, convert a computer or processing circuitry into a particular machine configured to perform an example embodiment of the present invention. Accordingly, the operations of FIGS. 3 and 5 define an algorithm for configuring a computer or processing circuitry, e.g., processor, to perform an example embodiment. In some cases, a general-purpose computer may be provided with an instance of the processor which performs the algorithm of FIGS. 3 and 5 to transform the general-purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. In some embodiments, certain ones of the operations above may be modified, or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computing device of a service provider, the computing device configured to construct a consolidated message, the computing device comprising:
a communication interface configured to receive first information regarding prescription medication from a pharmacy benefit management (PBM) entity in response to a prescription benefit coverage inquiry from a prescriber; and
processing circuitry configured to:
determine whether the prescription medication is supported by one or more operational services provided in association with the prescription medication and provided by a non-dispensing pharmacy, different than a preferred pharmacy of a patient by accessing a listing or record defining prescription medications supported by one or more operational services;
in response to determining that the prescription medication is not supported by one or more operational services, construct the consolidated message containing the first information;
in response to determining that the prescription medication is supported by one or more operational services, obtain second information regarding the one or more operational services from a memory device or a database, wherein the one or more operational services comprises services associated with one or more of: (i) one or more discounts, (ii) supporting compliance with risk evaluation mitigation strategies (REMS), (iii) prior authorization requirements, (iv) drug delivery, (v) financial assistance, or (vi) education, wherein the second information comprises contact information of the non-dispensing pharmacy and details pertaining to the one or more operational services provided in association with the prescription medication; and
construct the consolidated message having a predefined message format and containing both the first information and the second information that have been received from different parties,
wherein the communication interface is also configured to cause the consolidated message to be provided to the prescriber for the prescription benefit coverage inquiry, wherein the consolidated message contains both the first information and the second information in an instance in which the prescription medication is supported by one or more operational services,
wherein the processing circuitry is configured to conserve processing resources and network resources including bandwidth expended to construct the consolidated message relative to the processing resources and network resources otherwise expended to separately provide the first and second information by supporting separate streams of messages between the prescriber or a customer of the prescription and: (i) the PBM entity to obtain the first information in conjunction with a purchase of the prescription medication and (ii) a provider of the operational services in order to identify relevant operational services and to then obtain the second information regarding the one or more operational services that support the prescription medication.

2. A computing device according to claim 1 wherein the processing circuitry is configured to determine whether the prescription medication is supported by one or more operational services by accessing a table defining prescriptions medications supported by one or more operational services.

3. A computing device according to claim 1 wherein the processing circuitry is configured to obtain second information by obtaining messaging associated with the prescription medication that is to be provided to the prescriber.

4. A computing device according to claim 3 wherein the messaging identifies a point of contact to provide assistance with respect to the prescription medication.

5. A computing device according to claim 1 wherein the first information comprises benefit information, wherein the processing circuitry is further configured to determine from the benefit information whether a benefit is government funded, wherein the processing circuitry is configured in a manner dependent upon the benefit not being government funded to determine whether the prescription medication is supported by one or more hub services that identify a discount available for the prescription medication, and wherein the processing circuitry is configured in a manner dependent upon the benefit being government funded to eliminate a determination as to whether the prescription medication is supported by one or more hub services that identify a discount available for the prescription medication.

6. A method for constructing a consolidated message, the method comprising:
    receiving first information regarding prescription medication from a pharmacy benefit management (PBM) entity in response to a prescription benefit coverage inquiry from a prescriber;
    determining whether the prescription medication is supported by one or more operational services provided in association with the prescription medication and by a non-dispensing pharmacy, different than a preferred pharmacy of a patient, by accessing a listing or record defining prescription medications supported by one or more operational services;
    in response to determining that the prescription medication is not supported by one or more operational services, constructing the consolidated message containing the first information;
    in response to determining that the prescription medication is supported by one or more operational services, obtaining second information regarding the one or more operational services from a memory device or a database, wherein the one or more operational services comprises services associated with one or more of:
    (i) one or more discounts, (ii) supporting compliance with risk evaluation mitigation strategies (REMS), (iii) prior authorization requirements, (iv) drug delivery, (v) financial assistance, or (vi) education, wherein the second information comprises contact information of the non-dispensing pharmacy and details pertaining to the one or more operational services provided in association with the prescription medication;
    constructing the consolidated message having a predefined message format and containing both the first information and the second information that have been received from different parties; and
    causing the consolidated message to be provided to the prescriber for the prescription benefit coverage inquiry, wherein the consolidated message contains both the first information and the second information in the instance in which the prescription medication is supported by one or more operational services,
    wherein the method conserves processing resources and network resources including bandwidth expended to construct the consolidated message relative to the processing resources and network resources otherwise expended to separately provide the first and second information by supporting separate streams of messages between the prescriber or a customer of the prescription and: (i) the PBM entity to obtain the first information in conjunction with a purchase of the prescription medication and (ii) a provider of the operational services in order to identify relevant operational services and to then obtain the second information regarding the one or more operational services that support the prescription medication.

7. A method according to claim 6 wherein determining whether the prescription medication is supported by one or more operational services comprises accessing a table defining prescription medications supported by one or more operational services.

8. A method according to claim 6 wherein obtaining second information comprises obtaining messaging associated with the prescription medication that is to be provided to the prescriber.

9. A method according to claim 8 wherein the messaging identifies a point of contact to provide assistance with respect to the prescription medication.

10. A computer program product configured to construct a consolidated message, the computer program product comprising at least one non-transitory computer-readable storage medium having computer-executable program code instructions stored therein, the computer-executable program code instructions comprising program code instructions configured to:
    receive first information regarding prescription medication from a pharmacy benefit management (PBM) entity in response to a prescription benefit coverage inquiry from a prescriber;
    determine whether the prescription medication is supported by one or more operational services provided in association with the prescription medication and provided by a non-dispensing pharmacy, different than a preferred pharmacy of a patient, by accessing a listing or record defining prescription medications supported by one or more operational services;
    in an instance in which the prescription medication is not supported by one or more operational services, construct the consolidated message containing the first information;
    in an instance in which the prescription medication is supported by one or more operational services, obtain second information regarding the one or more operational services from a memory device or a database, wherein the one or more operational services comprises services associated with one or more of: (i) one or more discounts, (ii) supporting compliance with risk evaluation mitigation strategies (REMS), (iii) prior authorization requirements, (iv) drug delivery, (v) financial assistance, or (vi) education, wherein the second information comprises contact information of the non-dispensing pharmacy and details pertaining to the one or more operational services provided in association with the prescription medication;
    construct the consolidated message having a predefined message format and containing both the first information and the second information that have been received from different parties; and
    cause the consolidated message to be provided to the prescriber for the prescription benefit coverage inquiry, wherein the consolidated message contains both the first information and the second information in the instance in which the prescription medication is supported by one or more operational services,
    wherein the computer program product is configured to conserve processing resources and network resources including bandwidth expended to construct the consolidated message relative to the processing resources and network resources otherwise expended to separately provide the first and second information by supporting separate streams of messages between the prescriber or a customer of the prescription and: (i) the PBM entity to obtain the first information in conjunction with a purchase of the prescription medication and (ii) a provider of the operational services in order to identify relevant operational services and to then obtain the second information regarding the one or more operational services that support the prescription medication.

11. A computer program product according to claim 10 wherein the program code instructions configured to determine whether the prescription medication is supported by one or more operational services comprise program code instructions configured to access a table defining prescription medications supported by one or more operational services.

12. A computer program product according to claim 10 wherein the program code instructions configured to obtain second information comprise program code instructions configured to obtain messaging associated with the prescription medication that is to be provided to the prescriber.

13. A computer program product according to claim 12 wherein the messaging identifies a point of contact to provide assistance with respect to the prescription medication.

\* \* \* \* \*